US012658823B2

(12) United States Patent
Okabe et al.

(10) Patent No.: US 12,658,823 B2
(45) Date of Patent: Jun. 16, 2026

(54) POWER CONVERSION DEVICE AND METHOD FOR CONTROLLING POWER CONVERSION DEVICE

(71) Applicant: KABUSHIKI KAISHA TOYOTA JIDOSHOKKI, Aichi-ken (JP)

(72) Inventors: Kazuya Okabe, Kariya (JP); Masato Morikawa, Kariya (JP); Masahiro Ichigo, Kariya (JP); Takashi Takeuchi, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 209 days.

(21) Appl. No.: 18/660,618

(22) Filed: May 10, 2024

(65) Prior Publication Data

US 2024/0405697 A1 Dec. 5, 2024

(30) Foreign Application Priority Data

Jun. 2, 2023 (JP) ................................. 2023-091764

(51) Int. Cl.
| | |
|---|---|
| *H02M 3/335* | (2006.01) |
| *H02M 1/00* | (2007.01) |
| *H02M 1/36* | (2007.01) |
| *H02M 7/538* | (2007.01) |
| *H02M 7/5387* | (2007.01) |

(52) U.S. Cl.
CPC ..... *H02M 7/53871* (2013.01); *H02M 1/0067* (2021.05); *H02M 1/36* (2013.01); *H02M 3/33573* (2021.05)

(58) Field of Classification Search
CPC ........... H02M 7/5387; H02M 3/33573; H02M 1/007; H02M 1/0077; H02M 1/0067; H02M 1/327
See application file for complete search history.

(56) References Cited

U.S. PATENT DOCUMENTS

| | | | | | |
|---|---|---|---|---|---|
| 5,757,633 | A | * | 5/1998 | Bowles | ................... H02M 7/49 363/71 |
| 6,954,366 | B2 | * | 10/2005 | Lai | ........................ H02M 5/293 363/71 |

(Continued)

FOREIGN PATENT DOCUMENTS

JP 2018-61300 A 4/2018

*Primary Examiner* — Sisay G Tiku
(74) *Attorney, Agent, or Firm* — GREENBLUM & BERNSTEIN, P.L.C.

(57) ABSTRACT

A power conversion device includes an inverter, a state detector, a distribution board configured to distribute power output from the inverter such that single-phase three-wire alternating-current power is supplied to a first power supply port and single-phase two-wire alternating-current power is supplied to a second power supply port and a third power supply port, and processing circuitry configured to control the inverter and the distribution board. The processing circuitry is configured to determine whether there is an anomaly in one of a first inverter circuit and a second inverter circuit based on a detection result of the state detector, and when determining that there is an anomaly in one of the first inverter circuit and the second inverter circuit, stop the inverter circuit determined to have the anomaly and switch the first switch of the distribution board to an open state.

10 Claims, 8 Drawing Sheets

(56) References Cited

U.S. PATENT DOCUMENTS

| | | | |
|---|---|---|---|
| 11,177,648 B2 * | 11/2021 | Li | H02P 1/029 |
| 2009/0021971 A1 * | 1/2009 | Korich | H05K 7/20927 |
| | | | 363/141 |
| 2016/0336873 A1 * | 11/2016 | Ayai | H02M 3/33576 |
| 2018/0019684 A1 * | 1/2018 | Yamashita | H02M 7/4833 |
| 2024/0405695 A1 * | 12/2024 | Okabe | H02M 7/5387 |

* cited by examiner

POWER CONVERSION DEVICE AND METHOD FOR CONTROLLING POWER CONVERSION DEVICE

CROSS-REFERENCE TO RELATED APPLICATIONS

This application is based upon and claims the benefit of priority from prior Japanese Patent Application No. 2023-091764, filed on Jun. 2, 2023, the entire contents of which are incorporated herein by reference.

BACKGROUND

1. Field

The following description relates to a power conversion device and a method for controlling the power conversion device.

2. Description of Related Art

Japanese Laid-Open Patent Publication No. 2018-61300 discloses a technique related to a single-phase three-wire inverter that generates single-phase three-wire alternating-current power from direct-current power.

FIG. 8 is a circuit diagram showing an example of a conventional single-phase three-wire inverter. As shown in FIG. 8, a conventional single-phase three-wire inverter X1 includes an isolated DC/DC converter unit X10, smoothing capacitors C1 and C2, a full-bridge inverter unit X20, and output inductors L1 to L3. The isolated DC/DC converter unit X10 converts direct-current power output from a power supply PW. The smoothing capacitors C1 and C2 smooth the direct-current power converted by the isolated DC/DC converter unit X10. The full-bridge inverter unit X20 includes switching elements A1 to A4 and outputs alternating-current power by controlling switching of the switching elements.

Specifically, a connection point between the switching element A1 and the switching element A2 is connected to a first line of the single-phase three-wire system. A neutral point of an isolated transformer and a connection point between the smoothing capacitor C1 and the smoothing capacitor C2 are connected to a second line of the single-phase three-wire system that serves as a neutral line. A connection point between the switching element A3 and the switching element A4 is connected to a third line. The output inductors L1 to L3 are respectively arranged on the first line to the third line to adjust the waveform of alternating-current power output from the full-bridge inverter unit X20 to approximate an ideal sinusoidal waveform.

The conventional single-phase three-wire inverter X1 is connected to a first power supply port CN1, a second power supply port CN2, and a third power supply port CN3. The first power supply port CN1 uses the second line as a neutral line to supply a load with alternating-current power generated between the first line and the third line. The second power supply port CN2 supplies a load with alternating-current power generated between the first line and the second line. The third power supply port CN3 supplies a load with alternating-current power generated between the second line and the third line. As shown in FIG. 8, when a short-circuit failure occurs in part of the switching elements (switching element A1 in this example) included in the full-bridge inverter unit X20, the operation of the full-bridge inverter unit X20 needs to be stopped. When the full-bridge inverter unit X20 is stopped, the single-phase three-wire inverter X1 cannot output alternating-current power from any of the power supply ports.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power conversion device arranged between a power supply and a group of a first power supply port, a second power supply port, and a third power supply port is provided. The power conversion device includes an inverter configured to convert power output from the power supply into single-phase three-wire alternating-current power and single-phase two-wire alternating-current power, the inverter including a first terminal, a second terminal, and a neutral point terminal, a state detector configured to detect a state of the inverter, a distribution board configured to distribute power output from the inverter such that the single-phase three-wire alternating-current power is supplied to the first power supply port and the single-phase two-wire alternating-current power is supplied to the second power supply port and the third power supply port, and processing circuitry configured to control the inverter and the distribution board. The inverter includes a first inverter circuit and a second inverter circuit that are connected in parallel to the power supply. The first inverter circuit and the second inverter circuit each include a first output terminal and a second output terminal and are configured to generate the single-phase two-wire alternating-current power between the first output terminal and the second output terminal by converting the power output from the power supply. The first output terminal of the first inverter circuit is connected to the first terminal, the second output terminal of the second inverter circuit is connected to the second terminal, the second output terminal of the first inverter circuit and the first output terminal of the second inverter circuit are connected to each other at a connection point, and the connection point is connected to the neutral point terminal. The distribution board includes a first switch configured to switch a connection state between the first terminal and the first power supply port and a connection state between the second terminal and the first power supply port, a second switch configured to switch a connection state between the first terminal and the second power supply port and a connection state between the neutral point terminal and the second power supply port, and a third switch configured to switch a connection state between the neutral point terminal and the third power supply port and a connection state between the second terminal and the third power supply port. The processing circuitry is configured to determine whether there is an anomaly in one of the first inverter circuit and the second inverter circuit based on a detection result of the state detector, and when determining that there is an anomaly in one of the first inverter circuit and the second inverter circuit, stop the inverter circuit determined to have the anomaly and switch the first switch to an open state.

In another general aspect, a method for controlling a power conversion device arranged between a power supply and a group of a first power supply port, a second power supply port, and a third power supply port is provided. The power conversion device includes an inverter configured to convert power output from the power supply into single-phase three-wire alternating-current power and single-phase two-wire alternating-current power, the inverter including a first terminal, a second terminal, and a neutral point terminal, a state detector configured to detect a state of the inverter, and a distribution board configured to distribute power output from the inverter such that the single-phase three-wire alternating-current power is supplied to the first power supply port and the single-phase two-wire alternating-current power is supplied to the second power supply port and the third power supply port. The inverter includes a first inverter circuit and a second inverter circuit that are connected in parallel to the power supply. The first inverter circuit and the second inverter circuit each include a first output terminal and a second output terminal and are configured to generate the single-phase two-wire alternating-current power between the first output terminal and the second output terminal by converting the power output from the power supply. The first output terminal of the first inverter circuit is connected to the first terminal, the second output terminal of the second inverter circuit is connected to the second terminal, the second output terminal of the first inverter circuit and the first output terminal of the second inverter circuit are connected to each other at a connection point, and the connection point is connected to the neutral point terminal. The distribution board includes a first switch configured to switch a connection state between the first terminal and the first power supply port and a connection state between the second terminal and the first power supply port, a second switch configured to switch a connection state between the first terminal and the second power supply port and a connection state between the neutral point terminal and the second power supply port, and a third switch configured to switch a connection state between the neutral point terminal and the third power supply port and a connection state between the second terminal and the third power supply port. The method includes determining whether there is an anomaly in one of the first inverter circuit and the second inverter circuit based on a detection result of the state detector, and when determining that there is an anomaly in one of the first inverter circuit and the second inverter circuit, stopping the inverter circuit determined to have the anomaly and switch the first switch to an open state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

A power conversion device and a method for controlling the power conversion device according to one embodiment will now be described with reference to the drawings.

Overall Structure

Figure 1:
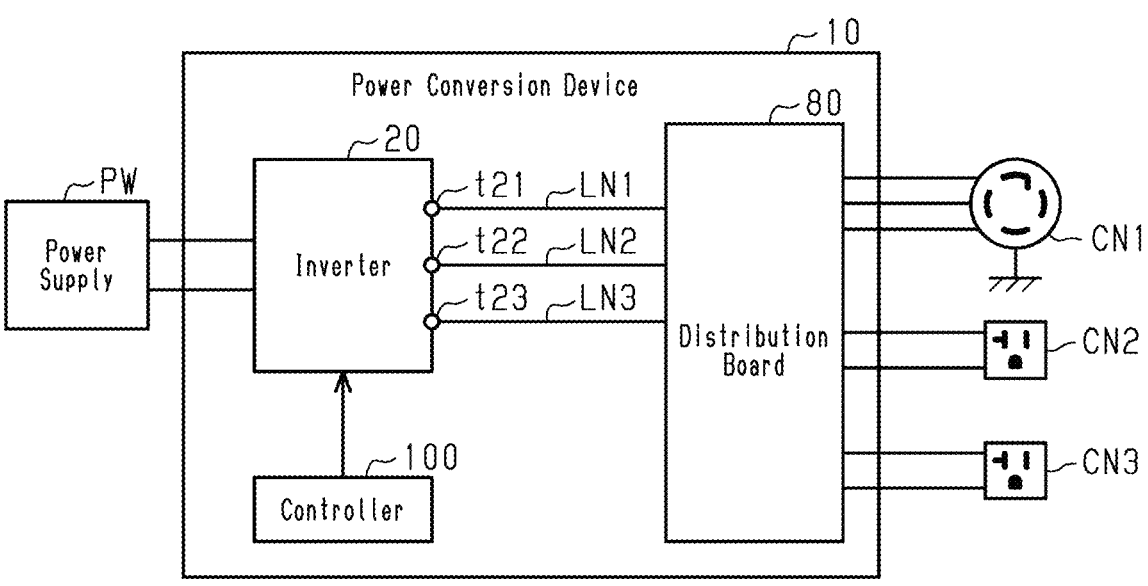
FIG. 1 is a diagram illustrating the configuration of a power conversion device according to one embodiment.

As shown in FIG. 1, a power conversion device 10 is connected to a power supply PW that supplies direct-current power to the power conversion device 10, a first power supply port CN1, a second power supply port CN2, and a third power supply port CN3. The power supply PW is, for example, a battery of a vehicle. The power conversion device 10 outputs commercial alternating-current power from the battery of the vehicle. The power conversion device 10 may be, for example, a device installed in the vehicle or a portable device that can be removed from the vehicle. The first power supply port CN1 is, for example, a single-phase three-wire outlet supplied with single-phase three-wire alternating-current power output from the power conversion device 10. The second power supply port CN2 and the third power supply port CN3 are, for example, single-phase two-wire outlets supplied with single-phase two-wire alternating-current power output from the power conversion device 10.

The power conversion device 10 includes a first line LN1, a second line LN2, and a third line LN3 of a single-phase three-wire system. The power conversion device 10 generates single-phase two-wire alternating-current power having a voltage of 100 V between the first line LN1 and the second line LN2 and between the second line LN2 and the third line LN3. Further, the power conversion device 10 uses the second line LN2 as a neutral line of the single-phase three-wire system to generate single-phase three-wire alternating-current power having a voltage of 200 V between the first line LN1 and the third line LN3. In the following description, the single-phase two-wire alternating-current power generated between the first line LN1 and the second line LN2 is also referred to as "first-phase alternating-current power." The single-phase two-wire alternating-current power generated between the second line LN2 and the third line LN3 is also referred to as "second-phase alternating-current power."

The power conversion device 10 includes an inverter 20, a distribution board 80, and a controller 100 that is processing circuitry. The controller 100 is implemented, for example, by a hardware processor such as a central processing unit (CPU) executing programs (software). Some or all of these constituent elements may be implemented by hardware (circuit unit including circuitry) such as a large scale integration (LSI), an application specific integrated circuit (ASIC), a field-programmable gate array (FPGA), or a graphics processing unit (GPU), or may be implemented by cooperation of software and hardware. The programs may be stored in advance in a storage device (not shown) including a non-transitory storage medium such as a hard disk drive (HDD) or a flash memory included in the power conversion device 10. The storage device may be implemented by various storage devices described above. Alternatively, the storage device may be implemented by an electrically erasable programmable read-only memory (EEPROM), a read-only memory (ROM), a random access memory (RAM), or the like. The controller 100 controls the inverter 20 such that the inverter 20 outputs single-phase three-wire alternating-current power.

Configuration of Inverter 20

Figure 2:
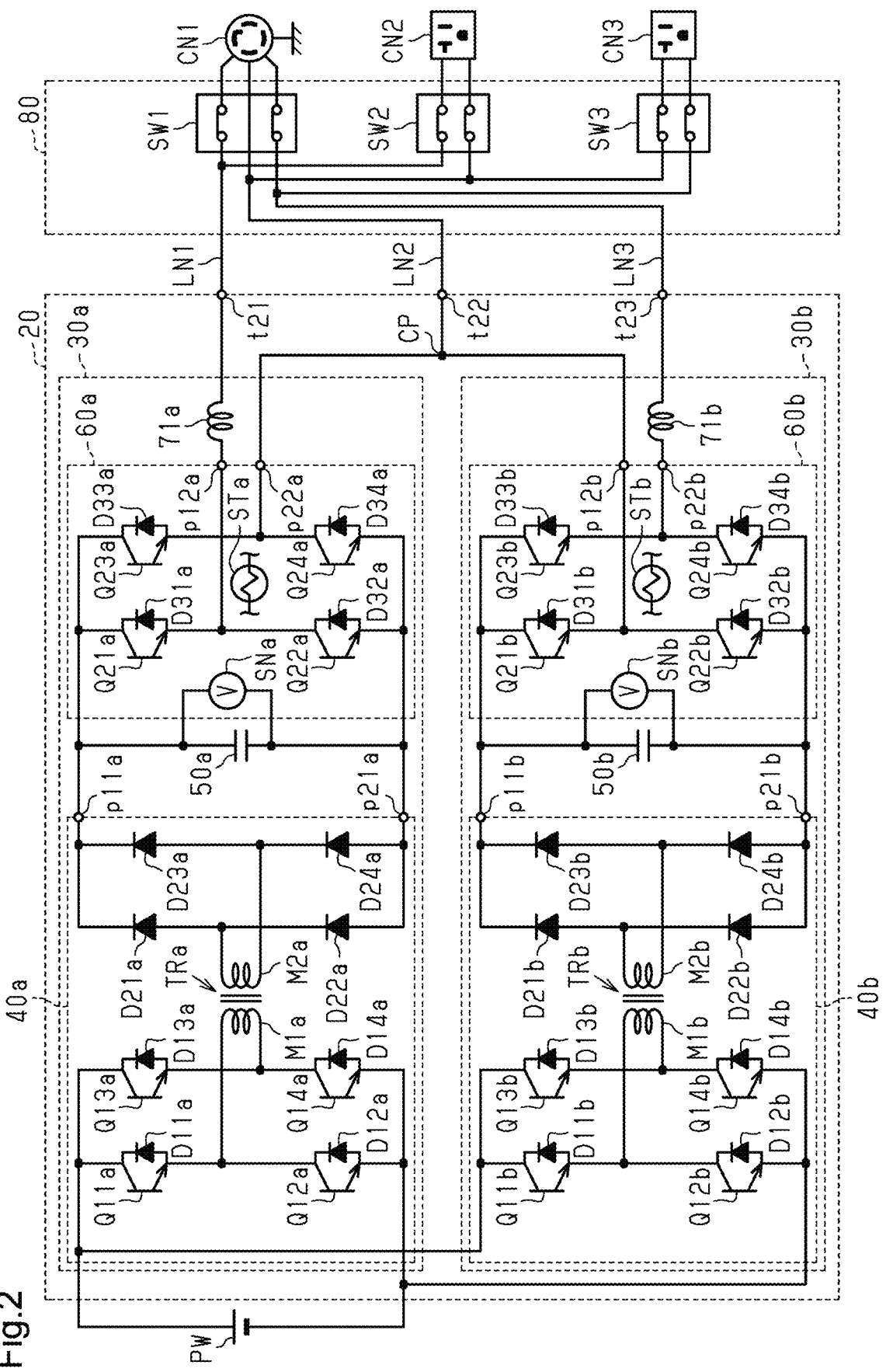
FIG. 2 is a diagram showing an example of the configurations of an inverter and a distribution board included in the power conversion device of FIG. 1.

As shown in FIG. 2, the inverter 20 includes, for example, a first inverter circuit 30a, a second inverter circuit 30b, a first terminal t21, a neutral point terminal t22, and a second terminal t23. The first inverter circuit 30a and the second inverter circuit 30b have the same basic configuration. In the following description, the reference numerals of components included in the first inverter circuit 30a have the suffix "a" and the reference numerals of components included in the second inverter circuit 30b have the suffix "b." In the following, the configuration of the first inverter circuit 30a will be described in detail, and the configuration of the second inverter circuit 30b will not be described. In the following description, when the components of the first inverter circuit 30a and the components of the second inverter circuit 30b are not distinguished from each other, the suffixes "a" and "b" of the reference numerals will be omitted. The first inverter circuit 30a and the second inverter circuit 30b will be simply referred to as the inverter circuit 30 when not distinguished from each other.

The first inverter circuit 30a includes, for example, an isolated DC/DC converter unit 40a, a smoothing capacitor 50a, a full-bridge inverter unit 60a, an output inductor 71a, a voltage detector SNa, and a temperature detector STa.

The isolated DC/DC converter unit 40a includes a switching element Q11a, a switching element Q12a, a switching element Q13a, a switching element Q14a, a freewheeling diode D11a, a freewheeling diode D12a, a freewheeling diode D13a, a freewheeling diode D14a, an isolated transformer TRa, a diode D21a, a diode D22a, a diode D23a, a diode D24a, a first output terminal p11a, and a second output terminal p21a. The isolated transformer TRa includes a primary-side coil M1a and a secondary-side coil M2a. In the isolated transformer TRa, the primary-side coil M1a and the secondary-side coil M2a are isolated from each other.

The switching elements Q11a to Q14a and the freewheeling diodes D11a to D14a are implemented by, for example, power switching elements such as insulated gate bipolar transistors (IGBTs). The switching elements Q11a to Q14a are respectively connected to the freewheeling diodes D11a to D14a. Specifically, the switching element Q11a is connected to the freewheeling diode D11a, the switching element Q12a is connected to the freewheeling diode D12a, the switching element Q13a is connected to the freewheeling diode D13a, and the switching element Q14a is connected to the freewheeling diode D14a. The cathodes of the freewheeling diodes D11a to D14a are connected to the collectors of the corresponding switching elements Q11a to Q14a, and the anodes of the freewheeling diodes D11a to D14a are connected to the emitters of the corresponding switching elements Q11a to Q14a.

The switching elements Q11a and Q12a are connected in series to each other by a connection wire. The connection wire is connected to one end of the primary-side coil M1a. The switching elements Q13a and Q14a are connected in series to each other by a connection wire. The connection wire is connected to the other end of the primary-side coil M1a. The collectors of the switching elements Q11a and Q13a are connected to the positive terminal of the power supply PW on the high-voltage side. The emitters of the switching elements Q12a and Q14a are connected to the negative terminal of the power supply PW on the low-voltage side. Thus, the switching elements Q11a to Q14a form a full-bridge inverter.

The cathodes of the diodes D21a and D23a are connected to the first output terminal p11a. The anodes of the diodes D22a and D24a are connected to the second output terminal p21a. A connection wire between the anode of the diode D21a and the cathode of the diode D22a is connected to one end of the secondary-side coil M2a. A connection wire between the anode of the diode D23a and the cathode of the diode D24a is connected to the other end of the secondary-side coil M2a. Thus, the diodes D21a to D24a form a diode bridge and rectify alternating-current power into direct-current power.

Switching of the switching elements Q11a to Q14a of the isolated DC/DC converter unit 40a is controlled based on control by the controller 100. This allows the isolated DC/DC converter unit 40a to convert direct-current power output from the power supply PW and generate the converted direct-current power between the first output terminal p11a and the second output terminal p21a.

One end of the smoothing capacitor 50a is connected to the first output terminal p11a and the other end is connected to the second output terminal p21a. The smoothing capacitor 50a smooths the direct-current power converted by the isolated DC/DC converter unit 40a.

The voltage detector SNa detects the voltage occurring across the two ends of the smoothing capacitor 50a and outputs information indicative of the detection result to the controller 100. In the embodiment, the voltage detector SN is an example of a "state detector."

The full-bridge inverter unit 60a includes a switching element Q21a, a switching element Q22a, a switching element Q23a, a switching element Q24a, a freewheeling diode D31a, a freewheeling diode D32a, a freewheeling diode D33a, a freewheeling diode D34a, a first output terminal p12a, and a second output terminal p22a.

The switching elements Q21a to Q24a and the freewheeling diodes D31a to D34a are implemented by, for example, power switching elements such as IGBTs. The switching elements Q21a to Q24a are respectively connected to the freewheeling diodes D31a to D34a. Specifically, the switching element Q21a is connected to the freewheeling diode D31a, the switching element Q22a is connected to the freewheeling diode D32a, the switching element Q23a is connected to the freewheeling diode D33a, and the switching element Q24a is connected to the freewheeling diode D34a. The cathodes of the freewheeling diodes D31a to D34a are connected to the collectors of the corresponding switching elements Q21a to Q24a, and the anodes of the freewheeling diodes D31a to D34a are connected to the emitters of the corresponding switching elements Q21a to Q24a.

The switching elements Q21a and Q22a are connected in series to each other by a connection wire. The switching elements Q23a and Q24a are connected in series to each other by a connection wire. The collectors of the switching elements Q21a and Q23a are connected to the first output terminal p11a and one end of the smoothing capacitor 50a. The emitters of the switching elements Q22a and Q24a are connected to the second output terminal p21a and the other end of the smoothing capacitor 50a.

The connection wire that connects the switching element Q21a and the switching element Q22a is connected to the first output terminal p12a of the full-bridge inverter unit 60a. The connection wire that connects the switching element Q23a and the switching element Q24a is connected to the second output terminal p22a of the full-bridge inverter unit 60a. Thus, the switching elements Q21a to Q24a form a full-bridge inverter.

The temperature detector STa detects the temperature of the smoothing capacitor 50a and/or the elements of the full-bridge inverter unit 60a and outputs temperature information indicative of the detection result to the controller 100. The temperature detector STa is, for example, a thermistor. The temperature detector STa is arranged, for example, at a position that allows for detection of the temperature of the smoothing capacitor 50a and/or a position that allows for detection of the temperature of each of the switching elements Q21a to Q24a. The positions that allow for detection of the temperature include the surface of the smoothing capacitor 50a and the surfaces of the switching elements Q21a to Q24a. In the embodiment, the temperature detector ST is an example of a "state detector."

Switching of the switching elements Q21a to Q24a of the full-bridge inverter unit 60a is controlled based on control by the controller 100. This allows the full-bridge inverter unit 60a to convert direct-current power, generated between the two ends of the smoothing capacitor 50a, and generate the converted alternating-current power between the first output terminal p12a and the second output terminal p22a.

The first output terminal p12a of the full-bridge inverter unit 60a is connected to one end of the output inductor 71a, and the other end of the output inductor 71a is connected to the first terminal t21. The second output terminal p22a of the full-bridge inverter unit 60a and a first output terminal p12b of the full-bridge inverter unit 60b are connected to each other at a connection point CP. The connection point CP is connected to the neutral point terminal t22. A second output terminal p22b of the full-bridge inverter unit 60b is connected to one end of an output inductor 71b, and the other end of the output inductor 71b is connected to the second terminal t23. The first terminal t21 is connected to the first line LN1, the neutral point terminal t22 is connected to the second line LN2, and the second terminal t23 is connected to the third line LN3. In other words, the second line LN2 is a neutral line. This allows the output inductors 71a and 71b to adjust the waveform of alternating-current power output from the full-bridge inverter units 60a and 60b to approximate an ideal sinusoidal waveform.

In other words, the full-bridge inverter unit 60a generates the first-phase alternating-current power between the first output terminal p12a and the second output terminal p22a. Further, the full-bridge inverter unit 60b generates the second-phase alternating-current power between the first output terminal p12b and the second output terminal p22b. The controller 100 controls the full-bridge inverter units 60a and 60b to adjust the phases of the first-phase alternating-current power and the second-phase alternating-current power, thereby outputting single-phase three-wire alternating-current power to the first line LN1 to the third line LN3. A control signal to the full-bridge inverter unit 60a and a control signal to the full-bridge inverter unit 60b are independent of each other.

Configuration of Distribution Board 80

The distribution board 80 includes, for example, a first switch SW1, a second switch SW2, and a third switch SW3. The first switch SW1, the second switch SW2, and the third switch SW3 switch a connection state by opening and closing based on control of the controller 100.

The first switch SW1 switches the connection state between the first power supply port CN1 and the inverter 20. The second switch SW2 switches the connection state between the second power supply port CN2 and the first inverter circuit 30a. The third switch SW3 switches the connection state between the third power supply port CN3 and the second inverter circuit 30b.

The first switch SW1, the second switch SW2, and the third switch SW3 are, for example, double-pole single-throw switches. One of the contacts of the first switch SW1 is arranged on the first line LN1 to switch the connection state between the first terminal t21 and the first power supply port CN1. The other one of the contacts of the first switch SW1 is arranged on the third line LN3 to switch the connection state between the second terminal t23 and the first power supply port CN1. One of the contacts of the second switch SW2 is arranged on the first line LN1 to switch the connection state between the first terminal t21 and the second power supply port CN2. The other one of the contacts of the second switch SW2 is arranged on the second line LN2 to switch the connection state between the neutral point terminal t22 and the second power supply port CN2. One of the contacts of the third switch SW3 is arranged on the second line LN2 to switch the connection state between the neutral point terminal t22 and the third power supply port CN3. The other one of the contacts of the third switch SW3 is arranged on the third line LN3 to switch the connection state between the second terminal t23 and the third power supply port CN3. Thus, the second power supply port CN2 is supplied with single-phase two-wire alternating-current power only from the first inverter circuit 30a. The third power supply port CN3 is supplied with single-phase two-wire alternating-current power only from the second inverter circuit 30b.

Process of Controller 100

Figure 3:
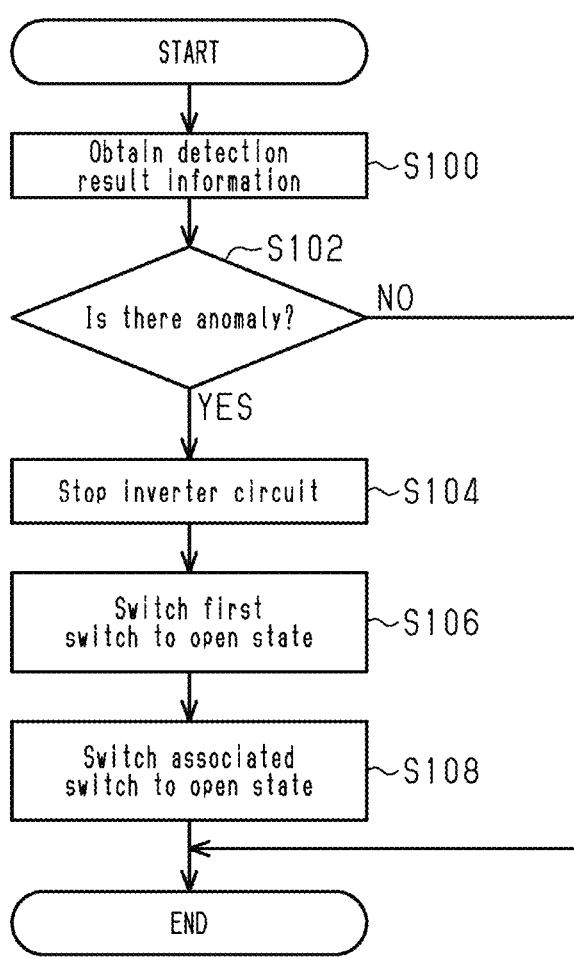
FIG. 3 is a flowchart showing an example of a process of a controller included in the power conversion device of FIG. 1.

As shown in FIG. 3, first, the controller 100 obtains information indicative of a detection result from the state detector (step S100). Specifically, the controller 100 obtains information indicative of a value of the voltage occurring across the two ends of the smoothing capacitor 50a from the voltage detector SNa and obtains information indicative of a value of the voltage occurring across the two ends of a smoothing capacitor 50b from a voltage detector SNb. The controller 100 determines whether there is an anomaly in one of the first inverter circuit 30a and the second inverter circuit 30b based on the information indicative of the detection result (step S102). For example, when a value of the detected voltage is less than a predetermined voltage, the controller 100 determines that there is an anomaly in one of the first inverter circuit 30a and the second inverter circuit 30b.

When determining that there is no anomaly in the inverter circuit 30, the controller 100 ends the process. When determining that there is an anomaly in one of the first inverter circuit 30a and the second inverter circuit 30b, the controller 100 stops the inverter circuit 30 determined to have the anomaly (step S104). The controller 100 stops the supply of single-phase two-wire alternating-current power from the inverter circuit 30 determined to have the anomaly by, for example, stopping switching control of the switching elements Q21 to Q24 of the full-bridge inverter unit 60 included in the inverter circuit 30 determined to have the anomaly.

Next, the controller 100 controls the first switch SW1 to an open state to switch the state between the inverter circuit 30 determined to have the anomaly and the first power supply port CN1 to a disconnected state (step S106). Next, the controller 100 controls, to an open state, the second switch SW2 or the third switch SW3 for the inverter circuit 30 determined to have the anomaly, thereby switching the state between the inverter circuit 30 determined to have the anomaly and the second power supply port CN2 or the third power supply port CN3 to a disconnected state (step S108).

Figure 4:
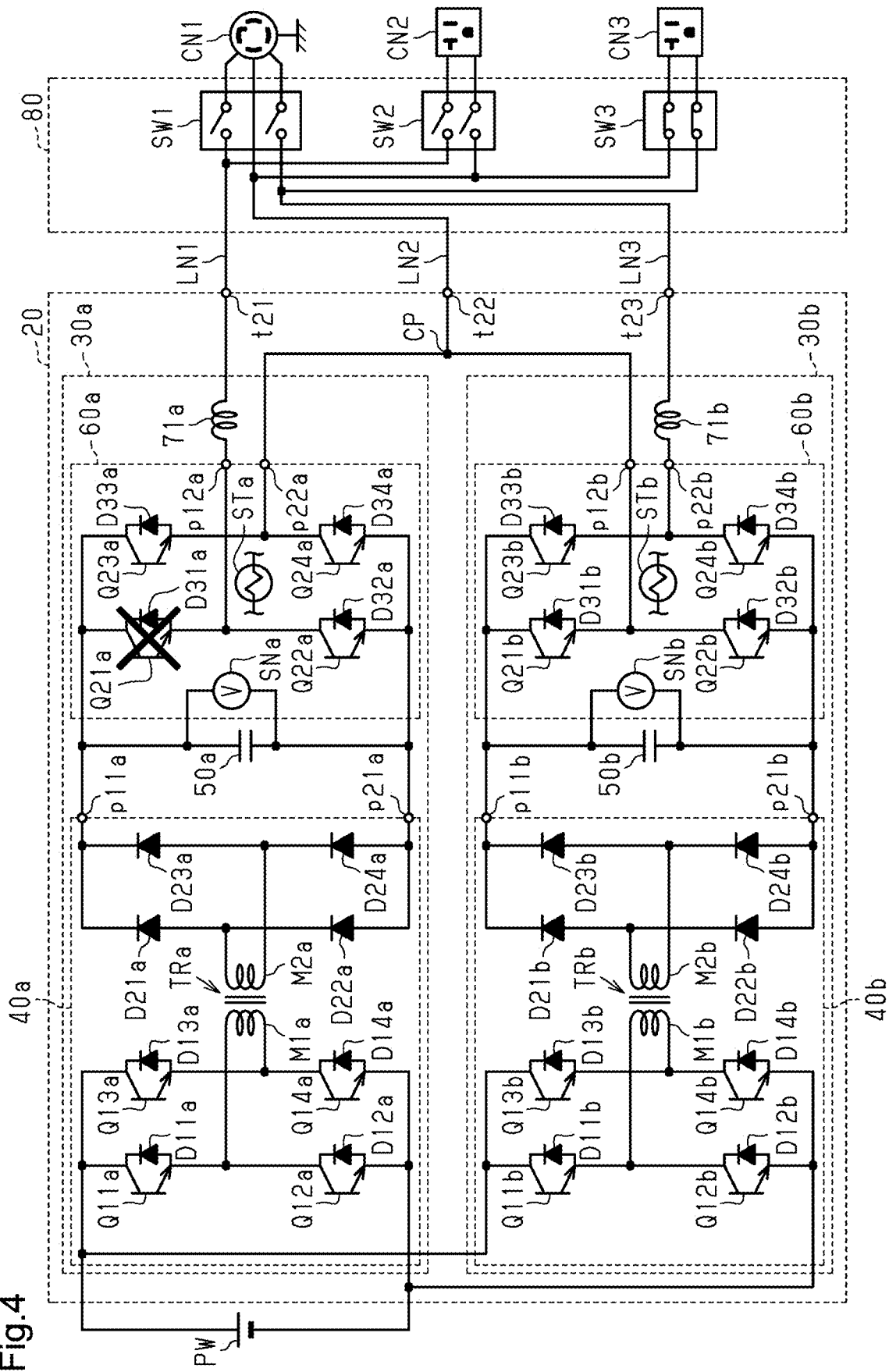
FIG. 4 is a diagram illustrating a distribution board when there is an anomaly in the inverter of FIG. 2.

In one example shown in FIG. 4, a short-circuit failure occurs in the switching element Q21a of the full-bridge inverter unit 60a included in the first inverter circuit 30a. In this case, the controller 100 determines that there is an anomaly in the first inverter circuit 30a. Then, the controller 100 controls the first switch SW1 and the second switch SW2 to an open state to switch the state between the first power supply port CN1 and the first inverter circuit 30a and the state between the second power supply port CN2 and the first inverter circuit 30a to a disconnected state.

Although not shown, when a short-circuit failure occurs in, for example, the switching element Q21b, the controller 100 determines that there is an anomaly in the second inverter circuit 30b. Then, the controller 100 controls the first switch SW1 and the third switch SW3 to an open state to switch the state between the first power supply port CN1 and the second inverter circuit 30b and the state between the third power supply port CN3 and the second inverter circuit 30b to a disconnected state.

Operation of Embodiment

When there is an anomaly in one of the first inverter circuit 30a and second inverter circuit 30b, the power conversion device 10 controls the first switch SW1 to an open state to switch the state between the inverter 20 and the first power supply port CN1 to a disconnected state. This prevents single-phase two-wire alternating-current power from being supplied to the first power supply port CN1 from the inverter circuit 30 determined to have no anomaly. Further, the power conversion device 10 controls the second switch SW2 or the third switch SW3 to remain in a closed state for the inverter circuit 30 determined to have no anomaly. This maintains the supply of single-phase two-wire alternating-current power to the second power supply port CN2 or the third power supply port CN3 for the inverter circuit 30 determined to have no anomaly.

Advantages of Embodiment

The above-described embodiment has the following advantages.

(1) The power conversion device 10 includes the inverter 20, the voltage detector SN serving as a state detector, the distribution board 80, and the controller 100. The inverter 20 includes the first inverter circuit 30a and the second inverter circuit 30b. The distribution board 80 includes the first switch SW1, the second switch SW2, and the third switch SW3. The first switch SW1 switches the connection state between the first terminal t21 and the first power supply port CN1 and the connection state between the second terminal t23 and the first power supply port CN1 based on control of the controller 100. The second switch SW2 switches the connection state between the first terminal t21 and the second power supply port CN2 and the connection state between the neutral point terminal t22 and the second power supply port CN2 based on control of the controller 100. The third switch SW3 switches the connection state between the neutral point terminal t22 and the third power supply port CN3 and the connection state between the second terminal t23 and the third power supply port CN3 based on control of the controller 100. The controller 100 determines whether there is an anomaly in one of the first inverter circuit 30a and second inverter circuit 30b based on a detection result of the voltage detector SN. When determining that there is an anomaly in one of the first inverter circuit 30a and second inverter circuit 30b, the controller 100 stops the inverter circuit 30 determined to have the anomaly, and switches the first switch SW1 to an open state.

With this configuration, when there is an anomaly in one of the first inverter circuit 30a and second inverter circuit 30b, the power conversion device 10 stops outputting single-phase three-wire alternating-current power to the first power supply port CN1. Further, the power conversion device 10 maintains output of single-phase two-wire alternating-current power to the second power supply port CN2 or the third power supply port CN3 for the inverter circuit 30 determined to have no anomaly. Further, the power conversion device 10 not only merely stops the inverter circuit 30 determined to have the anomaly, but also switches the first switch SW1 to an open state. Thus, the first power supply port CN1 is disconnected from the inverter circuit 30 determined to have no anomaly. Thus, the power conversion device 10 stops outputting single-phase two-wire alternating-current power to the first power supply port CN1 from the inverter circuit 30 determined to have no anomaly. This avoids an unnecessary and inappropriate supply of power to a device connected to the first power supply port CN1. In addition, the power conversion device 10 determines whether there is an anomaly in one of the first inverter circuit 30a and second inverter circuit 30b based on a detection result of the voltage detector SN.

(2) The first inverter circuit 30a includes the isolated DC/DC converter unit 40a that converts the power output from the power supply PW, the smoothing capacitor 50a that smooths the direct-current power output from the isolated DC/DC converter unit 40a, and the full-bridge inverter unit 60a that generates single-phase two-wire alternating-current power between the first output terminal p12a and the second output terminal p22a by converting the direct-current power generated between the two ends of the smoothing capacitor 50a. The second inverter circuit 30b includes the isolated DC/DC converter unit 40b that converts the power output from the power supply PW, the smoothing capacitor 50b that smooths the direct-current power output from the isolated DC/DC converter unit 40b, and the full-bridge inverter unit 60b that generates single-phase two-wire alternating-current power between the first output terminal p12b and the second output terminal p22b by converting the direct-current power generated between the two ends of the smoothing capacitor 50b. Stopping the inverter circuit 30 determined to have the anomaly includes stopping the full-bridge inverter unit 60 included in that inverter circuit 30.

With this configuration, the power conversion device 10 avoids an inappropriate output of single-phase two-wire alternating-current power from the inverter circuit 30 determined to have the anomaly.

Modifications

The present embodiment may be modified as follows. The present embodiment and the following modifications can be combined as long as the combined modifications remain technically consistent with each other. In the following description of modifications, like or the same reference numerals are given to those components that are like or the same as the corresponding components in the above-described embodiment and such components will not be described.

In the process of step S104, the controller 100 may further stop the isolated DC/DC converter unit 40 included in the inverter circuit 30 determined to have the anomaly. Specifically, the controller 100 further stops, for example, switching control of the switching elements Q11 to Q14 of the isolated DC/DC converter unit 40 included in the inverter circuit 30 determined to have the anomaly. With this configuration, the power conversion device 10 avoids an occurrence of a switching loss in the isolated DC/DC converter unit 40 of the inverter circuit 30 determined to have the anomaly.

The controller 100 may determine whether there is an anomaly in one of the first inverter circuit 30a and second inverter circuit 30b based on a detection result of the temperature detector ST instead of a detection result of the voltage detector SN. In this case, in the process of step S100, the controller 100 obtains, from the temperature detector STa, information indicative of a value of the temperature of the smoothing capacitor 50a and/or the elements of the full-bridge inverter unit 60a. Further, in the process of step S100, the controller 100 obtains, from a temperature detector STb, information indicative of a value of the temperature of the smoothing capacitor 50b and/or the elements of the full-bridge inverter unit 60b. In the process of step S102, when the value of the temperature detected by the temperature detector ST is higher than or equal to a predetermined temperature, the controller 100 determines that there is an anomaly in the inverter circuit 30. With this configuration, the power conversion device 10 determines whether there is an anomaly in one of the first inverter circuit 30a and second inverter circuit 30b based on the detection result of the temperature detector ST.

The temperature detector ST does not need to directly detect the temperature of the smoothing capacitor 50 and/or the elements of the full-bridge inverter unit 60. The temperature detector ST may, for example, measure the temperature of a heat dissipation path of the smoothing capacitor 50 and/or the elements of the full-bridge inverter unit 60 and estimate the temperature of the smoothing capacitor 50 and/or the elements of the full-bridge inverter unit 60 based on the temperature of the heat dissipation path. Further, the temperature detector ST may, for example, measure the temperature of coolant for cooling the smoothing capacitor 50 and/or the elements of the full-bridge inverter unit 60 and estimate the temperature of the smoothing capacitor 50 and/or the elements of the full-bridge inverter unit 60 based on the temperature of the coolant. In other words, the temperature detector ST may indirectly detect the temperature of the smoothing capacitor 50 and/or the elements of the full-bridge inverter unit 60.

The inverter circuit 30 in the embodiment does not need to include the temperature detector ST.

An output inductor may be connected to the second output terminal p22a of the full-bridge inverter unit 60a and an output inductor may be connected to the first output terminal p12b of the full-bridge inverter unit 60b in the embodiment.

Figure 5:
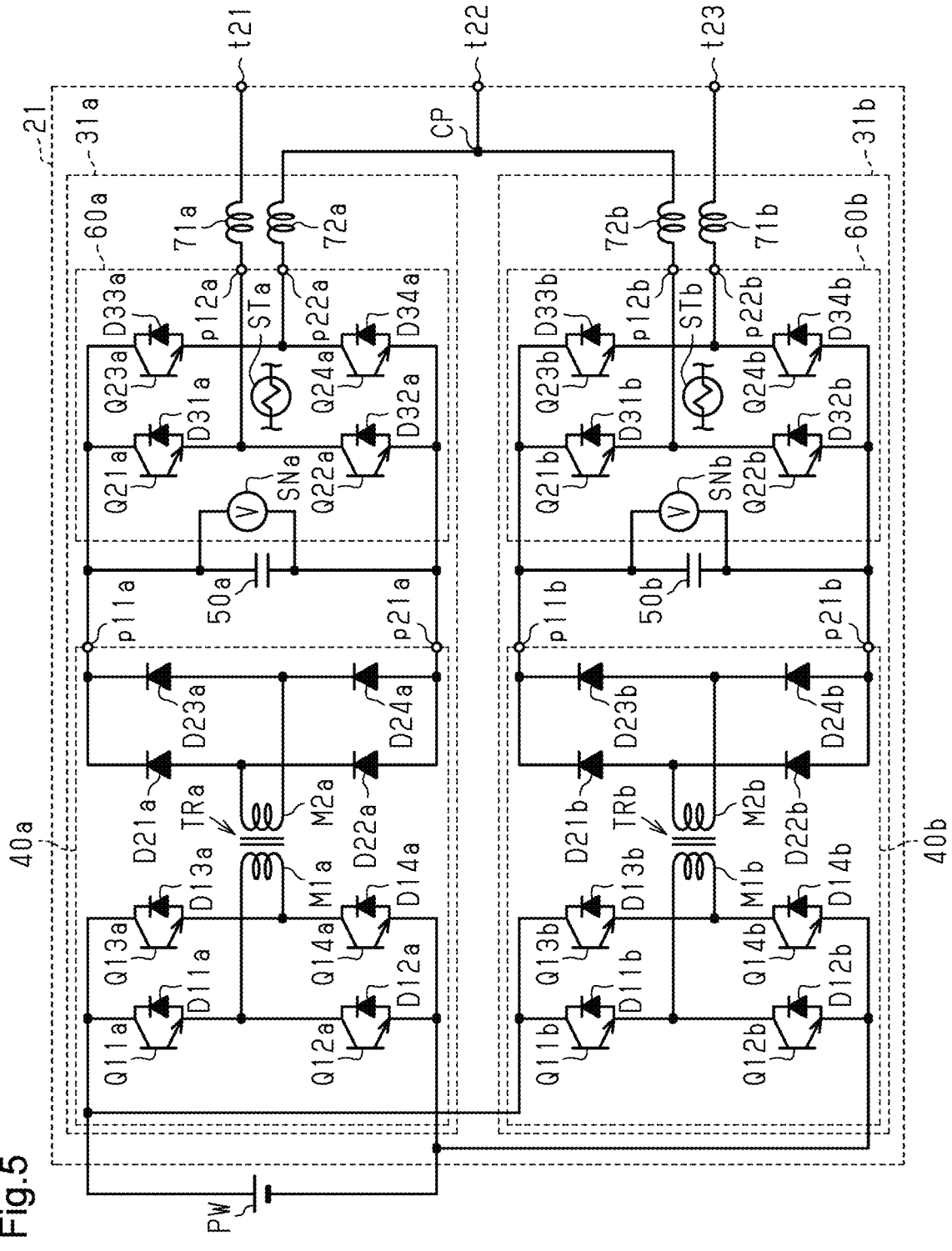
FIG. 5 is a diagram showing an example of the configuration of an inverter included in a vehicle on-board power conversion device according to a modification.

As shown in FIG. 5, an inverter 21 of the modification includes a first inverter circuit 31a in place of the first inverter circuit 30a and a second inverter circuit 31b in place of the second inverter circuit 30b. The first inverter circuit 31a includes an output inductor 72a in addition to the configuration of the first inverter circuit 30a. The second inverter circuit 31b includes an output inductor 72b in addition to the configuration of the second inverter circuit 30b. The configuration of the first inverter circuit 31a excluding the output inductor 72a is the same as that of the first inverter circuit 30a described above and will not be described. The configuration of the second inverter circuit 31b excluding the output inductor 72b is the same as that of the second inverter circuit 30b described above and will not be described.

In the inverters 21 of the modification, the second output terminal p22a is connected to one end of the output inductor 72a, and the other end of the output inductor 72a is connected to the connection point CP. The first output terminal p12b is connected to one end of the output inductor 72b, and the other end of the output inductor 72b is connected to the connection point CP. With this configuration, the power conversion device 10 adjusts the waveform of generated alternating-current power to further approximate an ideal sinusoidal waveform.

In addition, an output inductor may be connected to a portion shared between the downstream side of the second output terminal p22a of the full-bridge inverter unit 60a and the downstream side of the first output terminal p12a of the full-bridge inverter unit 60b in the embodiment.

Figure 6:
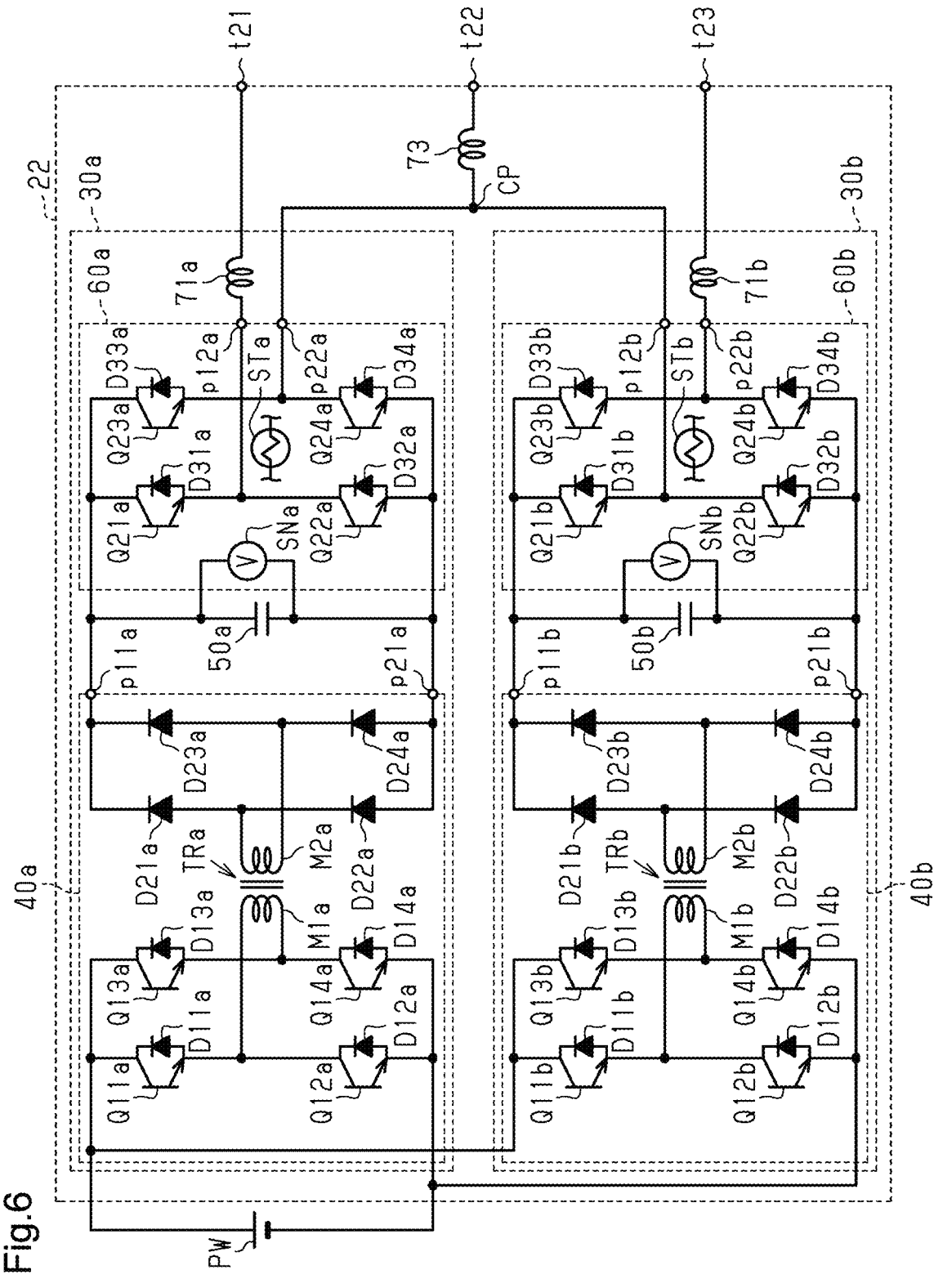
FIG. 6 is a diagram showing an example of the configuration of an inverter included in a vehicle on-board power conversion device according to another modification.

As shown in FIG. 6, an inverter 22 of the modification includes an output inductor 73 in addition to the components included in the inverter 20. The configuration of the inverter 22 excluding the output inductor 73 is the same as that of the inverter 20 described above and will not be described. One end of the output inductor 73 is connected to the connection point CP and the other end is connected to the neutral point terminal t22. With this configuration, the power conversion device 10 adjusts the waveform of generated alternating-current power to further approximate an ideal sinusoidal waveform while sharing the component.

The power conversion device 10 does not need to include some or all of the output inductors 71a, 71b, 72a, 72b, and 73 as long as the parasitic inductance of the circuit wiring in the power conversion device 10 or the inductance of a device connected to the power conversion device 10 adjusts the waveform of alternating-current power, output from the power conversion device 10, to approximate an ideal sinusoidal waveform. Further, when the power conversion device 10 outputs alternating-current power having a pseudo-sinusoidal waveform or a rectangular waveform to a load, the power conversion device 10 does not need to include the output inductors 71a, 71b, 72a, 72b, and 73.

The power conversion device 10 may include an isolated DC/DC converter unit that is implemented with a configuration differing from the configurations of the isolated DC/DC converter units 40a and 40b as long as a neutral point is separated between the first inverter circuit 30a and the second inverter circuit 30b. For example, such an isolated DC/DC converter unit may include a half bridge and a capacitor in place of the full-bridge configurations including the switching elements Q11a to Q14a and Q11b to Q14b.

The power conversion device 10 does not need to perform step S108 in FIG. 3. The power conversion device 10 may stop the inverter circuit 30 determined to have the anomaly to stop the supply of power to the second power supply port CN2 or the third power supply port CN3 for the inverter circuit 30 determined to have the anomaly.

The power conversion device 10 may be connected to two or more first power supply ports CN1. Likewise, the power conversion device 10 may be connected to two or more second power supply ports CN2, and the power conversion device 10 may be connected to two or more third power supply ports CN3.

The first switch SW1 may be a triple-pole single-throw switch having contacts on the first line LN1, the second line LN2, and the third line LN3.

In the above-described embodiment, the isolated DC/DC converter unit 40a and the isolated DC/DC converter unit 40b in the inverter 20 each include the primary-side circuit. However, the inverter 20 is not limited to this. In the following, a modification in which the inverter 23 includes an isolated DC/DC converter unit 41 with a shared primary-side circuit will be described.

Figure 7:
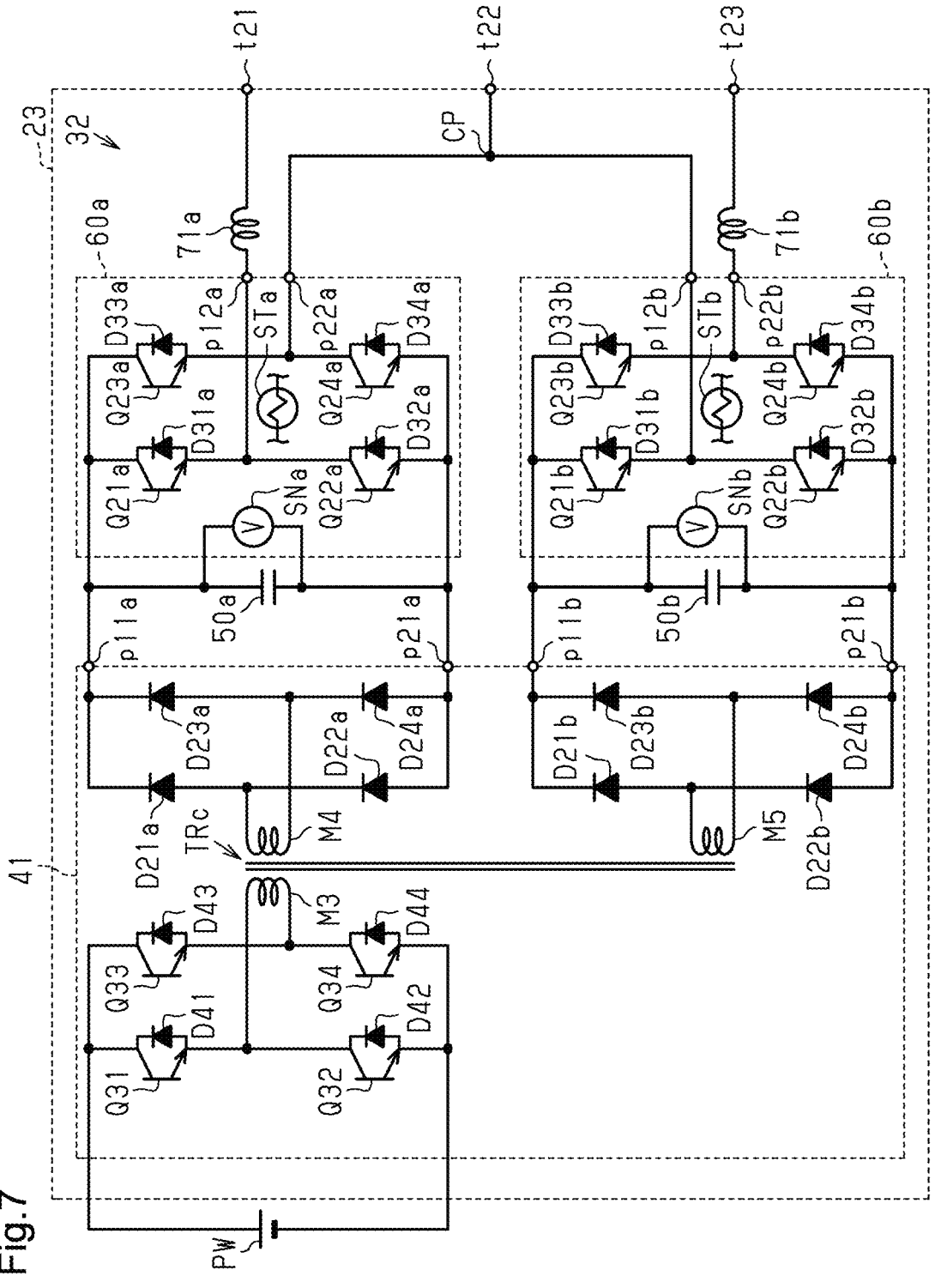
FIG. 7 is a diagram showing another example of the configuration of an isolated DC/DC converter unit included in a vehicle on-board power conversion device according to another modification.
Figure 8:
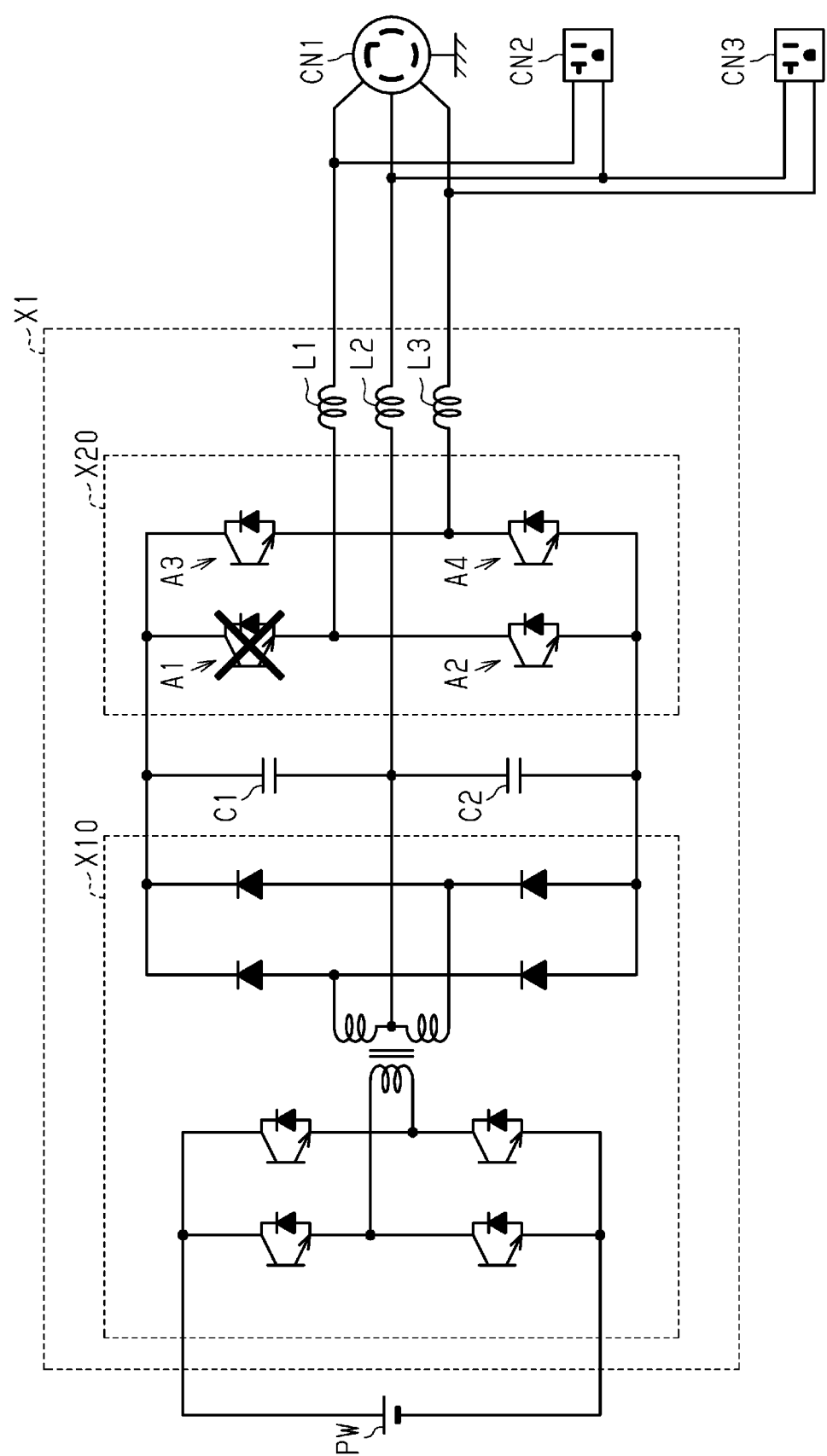
FIG. 8 is a diagram illustrating a conventional single-phase three-wire inverter.

As shown in FIG. 7, the inverter 23 includes an inverter circuit 32 in place of the first inverter circuit 30a and the second inverter circuit 30b. The inverter circuit 32 includes the isolated DC/DC converter unit 41, the smoothing capacitor 50a, the smoothing capacitor 50b, the full-bridge inverter unit 60a, the full-bridge inverter unit 60b, the output inductor 71a, the output inductor 71b, the first terminal t21, the neutral point terminal t22, and the second terminal t23. Like or the same reference numerals are given to those components in the inverter circuit 32 that are like or the same as the corresponding components in the first inverter circuit 30a and the second inverter circuit 30b and such components will not be described.

The isolated DC/DC converter unit 41 includes a switching element Q31, a switching element Q32, a switching element Q33, a switching element Q34, a freewheeling diode D41, a freewheeling diode D42, a freewheeling diode D43, a freewheeling diode D44, an isolated transformer TRc, diodes D21a to D24a, diodes D21b to D24b, first output terminals p11a, p11b, and second output terminals p21a, p21b. The isolated transformer TRc includes a primary-side coil M3, a first secondary-side coil M4, and a second secondary-side coil M5. In the isolated transformer TRc, the primary-side coil M3 is isolated from the first secondary-side coil M4 and the second secondary-side coil M5.

The switching elements Q31 to Q34 and the freewheeling diodes D41 to D44 are implemented by, for example, power switching elements such as IGBTs. The switching elements Q31 to Q34 are respectively connected to the freewheeling diode D41 to D44. Specifically, the switching element Q31 is connected to the freewheeling diode D41, the switching element Q32 is connected to the freewheeling diode D42, the switching element Q33 is connected to the freewheeling diode D43, and the switching element Q34 is connected to the freewheeling diode D44. The cathodes of the freewheeling diodes D41 to D44 are connected to the collectors of the corresponding switching elements Q31 to Q34, and the anodes of the freewheeling diodes D41 to D44 are connected to the emitters of the corresponding switching elements Q31 to Q34.

The switching elements Q31 and Q32 are connected in series to each other by a connection wire. The connection wire is connected to one end of the primary-side coil M3. The switching elements Q33 and Q34 are connected in series to each other by a connection wire. The connection wire is connected to the other end of the primary-side coil M3. The collectors of the switching elements Q31 and Q33 are connected to the positive terminal of the power supply PW on the high-voltage side. The emitters of the switching elements Q32 and Q34 are connected to the negative terminal of the power supply PW on the low-voltage side. Thus, the switching elements Q31 to Q34 form a full-bridge inverter.

A connection wire between the anode of the diode D21a and the cathode of the diode D22a is connected to one end of the first secondary-side coil M4. A connection wire between the anode of the diode D23a and the cathode of the diode D24a is connected to the other end of the first secondary-side coil M4. A connection wire between the anode of the diode D21b and the cathode of the diode D22b is connected to one end of the second secondary-side coil M5. A connection wire between the anode of the diode D23b and the cathode of the diode D24b is connected to the other end of the second secondary-side coil M5.

With this configuration, the inverters 23 separates a neutral point between the full-bridge inverter unit 60a, which generates first-phase alternating-current power, and the full-bridge inverter unit 60b, which generates second-phase alternating-current power, while having fewer components in the primary-side circuit of the isolated DC/DC converter unit 41 than the inverter 20. This reduces the size of the power conversion device 10.

The switching elements Q11a to Q14a, the switching elements Q21a to Q24a, and the switching elements Q31 to Q34 are not limited to IGBTs, and may be implemented by, for example, metal-oxide-semiconductor field-effect transistors (MOSFETs).

The power conversion device 10 may generate power other than 100 V as long as the voltage occurring across the first line LN1 and the second line LN2 matches the voltage occurring across the second line LN2 and the third line LN3.

The power conversion device 10 may be configured without using at least one of the first output terminals p11a, p11b, p12a, and p12b, the second output terminals p21a, p21b, p22a, and p22b, the first terminal t21, the neutral point terminal t22, and the second terminal t23.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power conversion device arranged between a power supply and a group of a first power supply port, a second power supply port, and a third power supply port, the power conversion device comprising:

an inverter configured to convert power output from the power supply into single-phase three-wire alternating-current power and single-phase two-wire alternating-current power, the inverter including a first terminal, a second terminal, and a neutral point terminal;

a state detector configured to detect a state of the inverter;

a distribution board configured to distribute the power output from the inverter such that the single-phase three-wire alternating-current power is supplied to the first power supply port and the single-phase two-wire alternating-current power is supplied to the second power supply port and the third power supply port; and processing circuitry configured to control the inverter and the distribution board, wherein the inverter includes a first inverter circuit and a second inverter circuit that are connected in parallel to the power supply, the first inverter circuit and the second inverter circuit each include a first output terminal and a second output terminal and are configured to generate the single-phase two-wire alternating-current power between the first output terminal and the second output terminal by converting the power output from the power supply, the first output terminal of the first inverter circuit is connected to the first terminal, the second output terminal of the second inverter circuit is connected to the second terminal, the second output terminal of the first inverter circuit and the first output terminal of the second inverter circuit are connected to each other at a connection point, the connection point is connected to the neutral point terminal, the distribution board includes a first switch configured to switch a connection state between the first terminal and the first power supply port and a connection state between the second terminal and the first power supply port, a second switch configured to switch a connection state between the first terminal and the second power supply port and a connection state between the neutral point terminal and the second power supply port, and a third switch configured to switch a connection state between the neutral point terminal and the third power supply port and a connection state between the second terminal and the third power supply port, and the processing circuitry is configured to determine whether there is an anomaly in one of the first inverter circuit and the second inverter circuit based on a detection result of the state detector, and when determining that there is the anomaly in one of the first inverter circuit and the second inverter circuit, stop the inverter circuit determined to have the anomaly and switch the first switch to an open state.

2. The power conversion device according to claim 1, wherein the first inverter circuit and the second inverter circuit each include an isolated DC/DC converter unit configured to convert the power output from the power supply, a smoothing capacitor configured to smooth direct-current power output from the isolated DC/DC converter unit, and a full-bridge inverter unit configured to generate the single-phase two-wire alternating-current power between the first output terminal and the second output terminal by converting the direct-current power generated between two ends of the smoothing capacitor, and the stopping of the inverter circuit determined to have the anomaly includes stopping of the full-bridge inverter unit included in the inverter circuit determined to have the anomaly.

3. The power conversion device according to claim 2, wherein the stopping of the inverter circuit determined to have the anomaly includes stopping of the isolated DC/DC converter unit included in the inverter circuit determined to have the anomaly.

4. The power conversion device according to claim 1, wherein the first inverter circuit and the second inverter circuit each include an isolated DC/DC converter unit configured to convert the power output from the power supply, a smoothing capacitor configured to smooth direct-current power output from the isolated DC/DC converter unit, and a full-bridge inverter unit configured to generate the single-phase two-wire alternating-current power between the first output terminal and the second output terminal by converting the direct-current power generated between two ends of the smoothing capacitor, the state detector is a voltage detector configured to detect a voltage occurring across the two ends of the smoothing capacitor, and the processing circuitry is further configured to determine that there is an anomaly when the voltage detected by the voltage detector is higher than a predetermined voltage.

5. The power conversion device according to claim 1, wherein the first inverter circuit and the second inverter circuit each include an isolated DC/DC converter unit configured to convert the power output from the power supply, a smoothing capacitor configured to smooth direct-current power output from the isolated DC/DC converter unit, and a full-bridge inverter unit configured to generate the single-phase two-wire alternating-current power between the first output terminal and the second output terminal by converting the direct-current power generated between two ends of the smoothing capacitor, the state detector is a temperature detector configured to detect a temperature of at least one of the smoothing capacitor and an element of the full-bridge inverter unit, and the processing circuitry is further configured to determine that there is an anomaly when the temperature detected by the temperature detector is higher than a predetermined temperature.

6. The power conversion device according to claim 1, wherein the first inverter circuit and the second inverter circuit each include an output inductor, the output inductor included in the first inverter circuit is arranged between the first output terminal of the first inverter circuit and the first terminal, and the output inductor included in the second inverter circuit is arranged between the second output terminal of the second inverter circuit and the second terminal.

7. The power conversion device according to claim 1, wherein the first inverter circuit and the second inverter circuit each include an output inductor, the output inductor included in the first inverter circuit is arranged between the second output terminal of the first inverter circuit and the connection point, and the output inductor included in the second inverter circuit is arranged between the first output terminal of the second inverter circuit and the connection point.

8. The power conversion device according to claim 1, further comprising:

an output inductor, wherein the output inductor is arranged between the connection point and the neutral point terminal.

9. The power conversion device according to claim 1, wherein the processing circuitry is further configured to, when determining that there is an anomaly in one of the first inverter circuit and the second inverter circuit, switch the second switch or the third switch for the inverter circuit determined to have the anomaly to an open state.

10. A method for controlling a power conversion device arranged between a power supply and a group of a first power supply port, a second power supply port, and a third power supply port, the power conversion device including:

an inverter configured to convert power output from the power supply into single-phase three-wire alternating-current power and single-phase two-wire alternating-current power, the inverter including a first terminal, a second terminal, and a neutral point terminal;

a state detector configured to detect a state of the inverter; and a distribution board configured to distribute the power output from the inverter such that the single-phase three-wire alternating-current power is supplied to the first power supply port and the single-phase two-wire alternating-current power is supplied to the second power supply port and the third power supply port, wherein the inverter includes a first inverter circuit and a second inverter circuit that are connected in parallel to the power supply, the first inverter circuit and the second inverter circuit each include a first output terminal and a second output terminal and are configured to generate the single-phase two-wire alternating-current power between the first output terminal and the second output terminal by converting the power output from the power supply, the first output terminal of the first inverter circuit is connected to the first terminal, the second output terminal of the second inverter circuit is connected to the second terminal, the second output terminal of the first inverter circuit and the first output terminal of the second inverter circuit are connected to each other at a connection point, the connection point is connected to the neutral point terminal, and the distribution board includes a first switch configured to switch a connection state between the first terminal and the first power supply port and a connection state between the second terminal and the first power supply port, a second switch configured to switch a connection state between the first terminal and the second power supply port and a connection state between the neutral point terminal and the second power supply port, and a third switch configured to switch a connection state between the neutral point terminal and the third power supply port and a connection state between the second terminal and the third power supply port, the method comprising:

determining whether there is an anomaly in one of the first inverter circuit and the second inverter circuit based on a detection result of the state detector; and when determining that there is the anomaly in one of the first inverter circuit and the second inverter circuit, stopping the inverter circuit determined to have the anomaly and switch the first switch to an open state.

* * * * *